Feb. 27, 1940.  F. M. REID  2,191,941
SPRING SUSPENSION
Filed Dec. 24, 1938   2 Sheets-Sheet 2
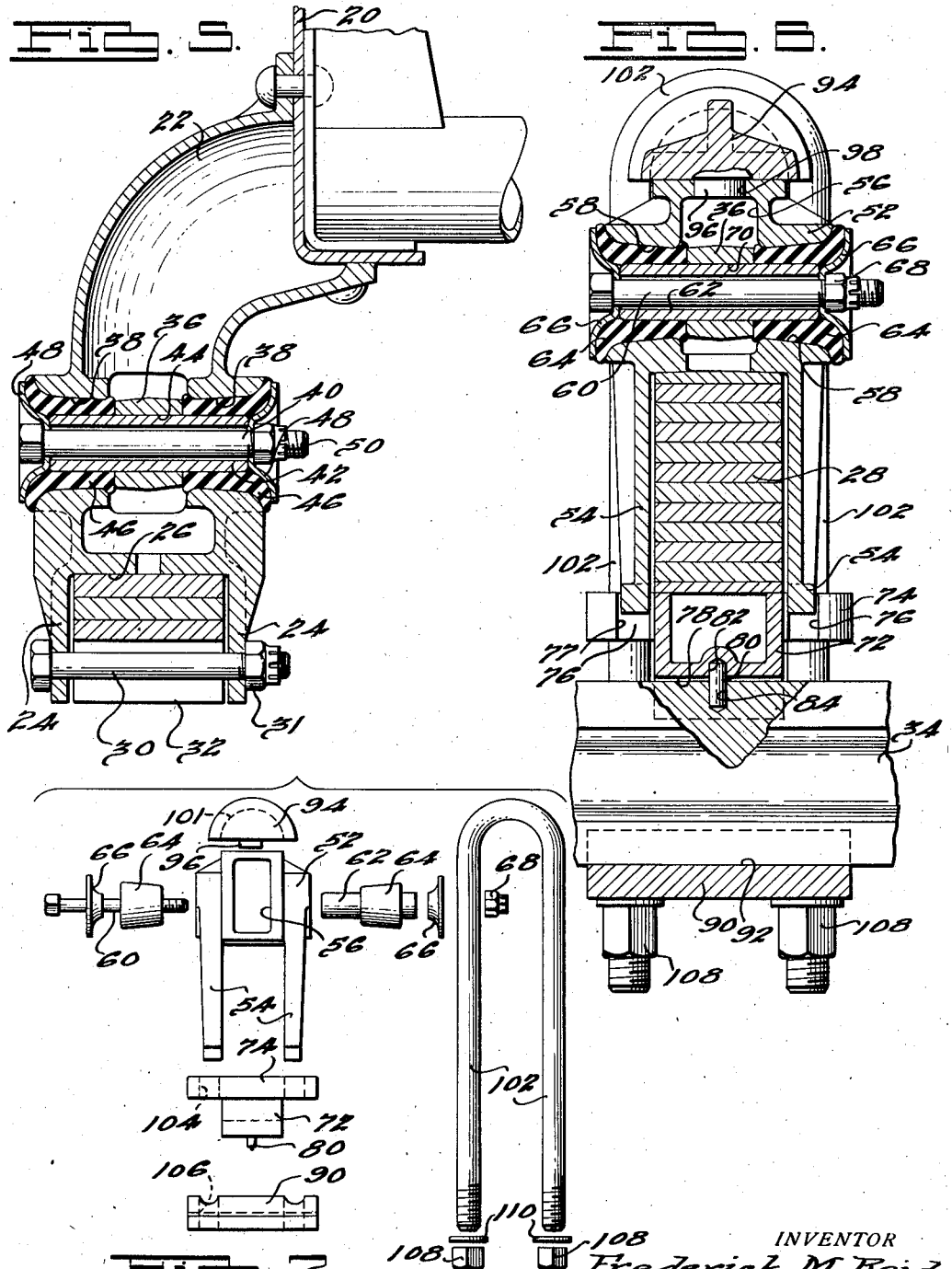
INVENTOR
Frederick M. Reid.
BY
Harness, Dickey & Pierce
ATTORNEYS.

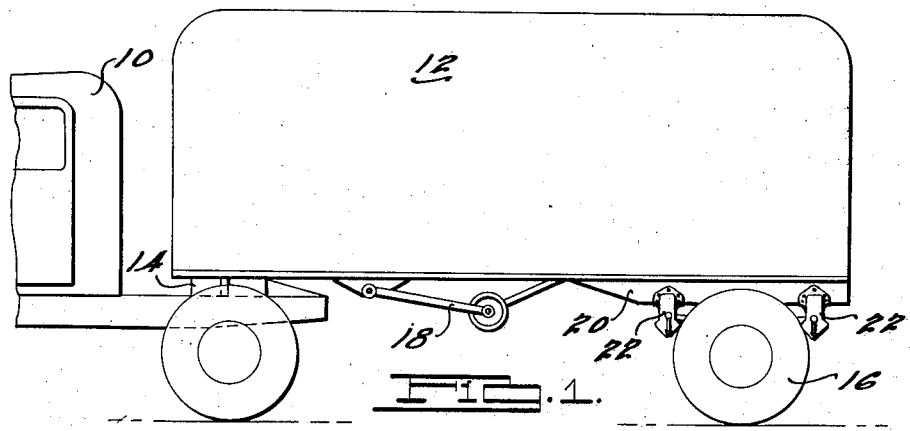
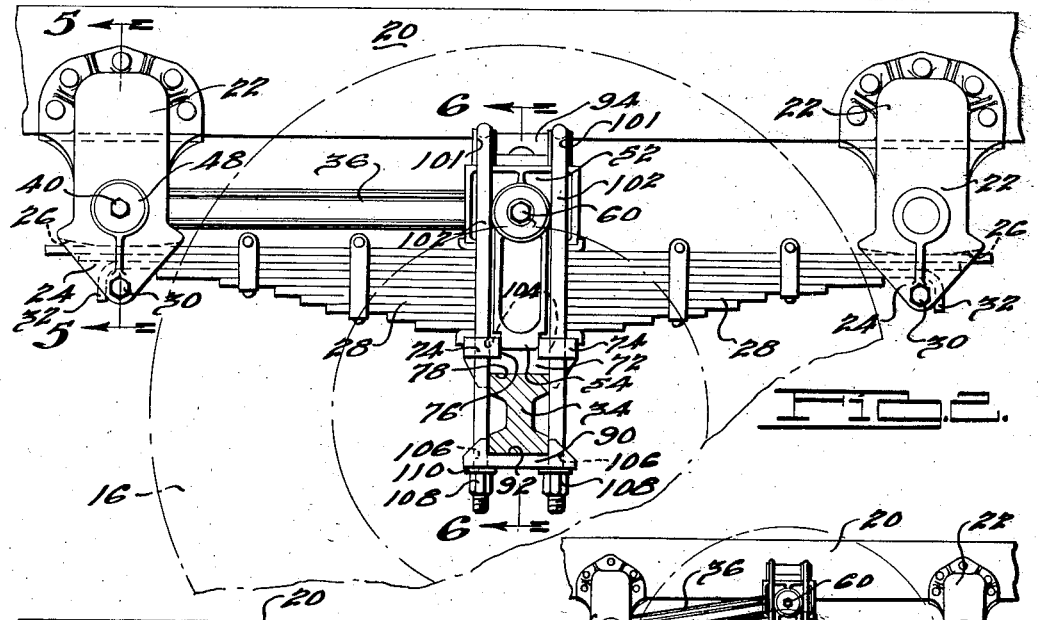
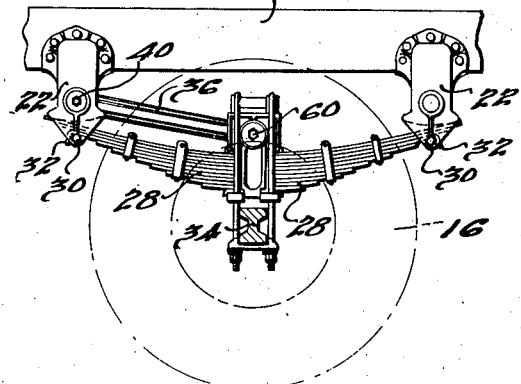
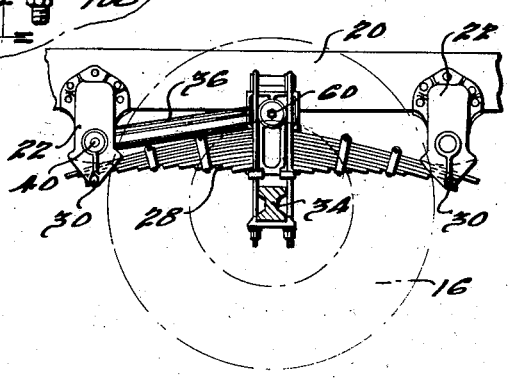

Patented Feb. 27, 1940

2,191,941

UNITED STATES PATENT OFFICE 2,191,941

SPRING SUSPENSION

Frederick M. Reid, Detroit, Mich., assignor to Fruehauf Trailer Company, Detroit, Mich., a corporation of Michigan Application December 24, 1938, Serial No. 247,607

3 Claims. (Cl. 280—124)

The present invention relates to spring suspension constructions and particularly relates to such constructions for use on semi-trailer vehicles.

One of the primary objects of the present invention is to provide an improved arrangement of radius rod relative to the spring and axle so that the associated parts may be simpler than in prior constructions, thereby providing a less expensive assembly.

Another object of the invention is to provide an improved combination arrangement of radius rod spring and axle in which the spring is so constructed and arranged that upon increase in load its resistance to deflection is increased and conversely, upon decrease in load its resistance to deflection is decreased, thereby providing a spring suspension assembly which functions properly over a wide range of loads.

A more specific object of the invention is to provide an improved spring suspension assembly in which the axle is disposed below the spring and the radius rod is disposed above the spring and connected to the axle in such a way that the effect is the same as though the radius rod were connected directly to the axle, but in which the elements forming the assembly are of simpler construction and occupy less room than in constructions employing the direct connection between the rod and axle.

Another object of the invention is to provide an improved manner of connecting a radius rod to an axle so that the spring assembly occupies a minimum of room.

Other objects of the invention will become apparent from the following specification, the drawings relating thereto and from the claims hereinafter set forth.

In the drawings in which like numerals are used to designate like parts in the several views throughout:

Figure 1 is a fragmentary side elevational view of a tractor and trailer construction in which an improved spring suspension construction according to the present invention is employed on the trailer;

Fig. 2 is an enlarged side elevational view of the spring suspension illustrated in Fig. 1, in which the elements forming the assembly are at substantially their positions for normal load;

Fig. 3 is a view similar to Fig. 2, on a reduced scale, showing the elements of the assembly in substantially their positions at no load;

Fig. 4 is a view similar to Fig. 3, showing the elements of the assembly in substantially their positions at full load;

Fig. 5 is an enlarged cross-sectional view taken substantially along the line 5—5 of Fig. 2;

Fig. 6 is an enlarged cross-sectional view taken substantially along the line 6—6 of Fig. 2; and, Fig. 7 is an exploded elevational view of certain parts constituting the mounting and connecting means for the radius rod, spring and axle.

Referring to the drawings, a tractor is partially illustrated at 10 having a trailer 12 connected thereto through the usual fifth wheel means 14. The trailer 12 has the usual ground wheels 16 adjacent the rear thereof connected to the trailer through spring suspension constructions according to the present invention. A retractable ground support 18 of suitable construction is associated with the trailer 12 in the usual way so as to support the forward end of the trailer when it is disconnected from the tractor.

The trailer 12 includes as a part of its underframe construction a longitudinally extending supporting member 20 which serves as a support for the spring suspension means. The spring suspension means includes longitudinally spaced, downwardly directed hangers 22 which are secured to the member 20, at each side of the vehicle, by means of rivets or otherwise. Each hanger 22 terminates adjacent the lower end thereof in spaced leg portion 24 between which is formed a bearing surface 26 which is longitudinally curved, as best seen in Fig. 2.

A leaf spring assembly 28 is disposed between the spaced hangers 22 at each side of the vehicle; and each end of the leaf spring assembly 28 is adapted to be mounted to the hanger adjacent that end between the legs 24 by means of a transversely extending bolt 30 which is received through aligned openings in the lower ends of the legs 24 and can be secured therein by a suitable nut 31. The ends of the uppermost leaves of the spring assembly 28 are adapted to be received within the space between the bolt 30 and the bearing surface 26, and the top surface of the top leaf spring is adapted to bear against the curved bearing surface 26.

In order to hold the spring assembly 28 against longitudinal displacement, the ends of these leaves which rest upon the bolts 30 may be bent downwardly around the bolts as indicated at 32. There is substantially line contact between the upper most leaf spring and its bearing surfaces 26, and as the spring is deflected from no load to full load the lines of contact shift from the outer edges of the bearing surfaces 26, as shown in Fig. 3, to the inner edges thereof, as shown in Fig. 4. The effective length of the spring thus shortens on increases in load, and as a practical matter there is a possible shortening of five inches at each end of the spring giving a total ten inches shortening in effective length of the spring from no load to full load. The effect of this construction is that upon shortening the effective length of the spring, the resistance to deflection increases, and conversely, on lengthening the effective length of the spring, the resistance to deflection decreases, so that proper and desired spring characteristics are present over a wide range of loads. There is also practically no slippage between the leaf springs and the bearing surfaces 26, the slippage amounting to only about 1/16 of an inch which takes care of the longitudinal displacement of the one end of the radius rod as it moves within its arc between no load and full load.

A transversely extending axle member 34 is disposed under the springs 28 at substantially the longitudinal centers thereof and is adapted to have the ground wheel 16 connected thereto in the usual way.

A radius rod 36 is disposed above each spring 28, extending longitudinally thereof; and each radius rod 36 is adapted to be pivotally connected to the forward hanger 22 on each side of the vehicle. To so pivotally mount the forward end of the radius rod, the body portion of the hanger 22 is hollow and is provided with suitable openings in the front and rear walls thereof so that the forward end of the radius rod 36 extends through the rear opening to a position within the body portion of the hanger. Transversely aligned openings 38 are formed in the body portion of the hanger which are adapted to receive therethrough a pivot pin 40. A bearing sleeve 42 is disposed over the pivot pin 40, and the sleeve 42 is received within a pivot opening 44 formed in the forward end of the radius rod 36 so that the radius rod 36 is pivotally mounted relative to the hanger 22.

Rubber bushings 46 are disposed within the openings 38 between the inner surfaces thereof and the outer surface of the sleeve 42 so that a resilient pivotal mounting is provided for the radius rod. Disc-shaped end members 48 are disposed over the outer ends of the bolts 40 and are so shaped that they bear against the ends of the rubber bushings 46, so that when a nut 50 is drawn up on the bolt 40, the bushings 46 and sleeves 42 are securely held in position so that the radius rod is securely positioned for pivotal mounting within the hanger.

In order to pivotally mount the rear end of the radius rod 36, a radius rod bracket is provided which includes a body portion 52 formed with downwardly directed spaced lugs 54. The body portion 52 is provided with longitudinally extending openings 56 within which the rear end of the radius rod is adapted to be received, the openings 56 being of such a shape that the rod is free to pivot within the body portion. The means for pivotally mounting the rear end of the radius rod 36 to the bracket body portion 52 is similar to that described above for mounting the forward end of the radius rod to the hanger 22. That is, transversely aligned openings 58 are formed in the body portion 52, and a pivot pin 60, sleeve 62, rubber bushings 64, end members 66, and a nut 68 are disposed within the openings 58 for mounting the rear end of the radius rod 36 through the pivot opening 70 in the same manner and arrangement as the bolt 40, sleeve 42, bushings 46, end members 48 and nut 50, above described.

The spring 28 is adapted to be received within the space between the depending legs 54 at substantially the longitudinal center of the spring assembly 28, and a spring seat having a body portion 72 with side flanges 74 formed integral therewith is disposed under the spring for engaging the under-surface thereof. The flanges 74 are spaced apart on opposite sides thereof to provide guideways 76 within which the lower ends of the legs 54 are doweled so that the radius rod bracket is rigidly mounted relative to the spring. The facing edges of these flanges may be grooved as indicated at 77 as to further support the legs against outward thrust. The under-surface of the body portion 72 is formed to provide a downwardly directed channel 78 within which the top of the axle 34 is adapted to be received. A pin 80 is received within complementary openings 82 and 84 in the body portion 72 and top of the axle member 34 for properly positioning the axle within the spring seat 72.

An axle seat 90 formed with an upwardly disposed channel 92 in the top thereof is positioned under the axle 34 so that the lower edge of the axle is received within the channel 92.

In order to fix the above described mounting members in a rigid unit, a top member 94 is disposed on the top surface of the body portion 52 of the radius rod bracket, and this top member is provided with a downwardly extending projection 96 which is received within a complementary shaped opening 98 formed in the top surface of the body portion 52. The top member 94 is formed with semi-circular upwardly disposed channels 101 therein at the front and rear sides thereof for the reception of the bases of strap members in the form of U-bolts 102. The legs of the U-bolts 102 extend downwardly along the sides of the radius rod bracket, extend through openings 104 in the flanges 74 of the spring seat and extend downwardly through openings 106 in the axle seat 90. Nuts 108 are adapted to be threadably received over the lower ends of the U-bolts 102 and bear against washers 110 which in turn bear against the under-surface of the member 90. By drawing the nuts 108 upwardly, it will be evident that the U-bolts 102 are firmly positioned within the channels 101 and firmly draw the top member 94, radius rod bracket 52, spring seat 72, and axle seat 90, together so that a rigid connection is provided between the axle 34, the spring 28 and the pivotal mounting for the rear end of the radius rod 36.

The construction above described provides an improved and simplified spring suspension construction in which the elements forming the assembly may be of simple construction and occupy less room than in prior constructions.

Formal changes may be made in the specific embodiment of the invention described without departing from the spirit and substance of the invention, the scope of which is commensurate with the appended claims.

What is claimed is:

1. A vehicle spring suspension comprising downwardly directed longitudinally spaced hangers fixed to said vehicle, a leaf spring disposed between and mounted on said hangers, an axle member disposed beneath said spring at substantially the mid-point thereof, a radius rod disposed above said spring, means pivotally connecting one end of said rod to one of said hangers, the other end of said rod extending to a position above the longitudinal mid-point of said spring, means connecting said axle and spring including a first member disposed above said spring substantially miday between the ends thereof, means pivotally connecting said other end of said rod to said first member, said first member having depending side portions integral therewith receiving said spring therebetween with said spring bearing against the under side thereof, a second member engaging the under side of said spring and having guideways receiving the lower ends of said side portions therein, said second member having a depending integral portion with a downwardly directed channel receiving the top of said axle member therein, a third member having an upwardly directed channel receiving the bottom of said axle member therein, and strap means engaging said first, second, and third members thereby rigidly securing said members with respect to said spring and said axle member and connecting said axle member and said spring.

2. A vehicle spring suspension comprising downwardly directed, longitudinally spaced hangers fixed to said leaf, a leaf spring disposed between and mounted on said hangers, an axle member disposed beneath said spring at substantially the mid point thereof, a radius rod disposed above said spring, means pivotally connecting one end of said rod to one of said hangers including non-metallic resilient pivot bearings, the other end of said rod extending to a position above the longitudinal mid point of said spring, means connecting said axle and spring including a first member disposed above said spring substantially midway between the ends thereof, means pivotally connecting said other end of said rod to said first member including non-metallic resilient pivot bearings, said first member having depending side portions rigidly connected thereto receiving said spring therebetween with said spring bearing against the under side thereof, a second member engaging the under side of said spring and having guideways receiving the lower ends of said side portions therein, said second member having a depending integral portion with a downwardly directed channel receiving the top of said axle member therein, a third member having an upwardly directed channel receiving the bottom of said axle member therein, a fourth member having a rounded upper surface and having upwardly extending grooves formed therein disposed on the top of said first member, a U-bolt disposed within each of said grooves engaging said first, second, and third members, thereby rigidly securing said member with respect to said spring and said axle member and connecting said axle member and said spring.

3. A vehicle spring suspension comprising downwardly directed, longitudinally spaced hangers fixed to said vehicle, a leaf spring disposed between and mounted on said hangers, an axle member disposed beneath said spring at substantially the mid point thereof, a radius rod disposed above said spring, means pivotally connecting one end of said rod to one of said hangers, the other end of said rod extending to a position above the longitudinal mid point of said spring, means connecting said axle and spring including a first member disposed above said spring substantially midway between the ends thereof, means pivotally connecting said other end of said rod to said first member, said first member having rigid depending side portions rigidly connected thereto receiving said spring therebetween, the said spring bearing against the under side of said first member, a second member engaging the under side of said spring and having guideways receiving the lower ends of said side portions therein, said second member being disposed so that the under surface thereof engages the top of said axle member, a third member so disposed that the top surface thereof engages the under surface of said axle member, and means engaging said first, second, and third members thereby rigidly securing said members with respect to said spring and said axle and connecting said axle and said spring.

FREDERICK M. REID.